(12) United States Patent
Dahn et al.

(10) Patent No.: US 8,137,841 B2
(45) Date of Patent: Mar. 20, 2012

(54) CATHODE COMPOSITIONS FOR LITHIUM-ION ELECTROCHEMICAL CELLS

(75) Inventors: Jeffrey R. Dahn, Upper Tantallon (CA); Peng Liao, Halifax (CA)

(73) Assignee: 3M Innovative Properties Company, St. Paul, MN (US)

( * ) Notice: Subject to any disclaimer, the term of this patent is extended or adjusted under 35 U.S.C. 154(b) by 416 days.

(21) Appl. No.: 12/550,762

(22) Filed: Aug. 31, 2009

(65) Prior Publication Data

US 2011/0049418 A1  Mar. 3, 2011

(51) Int. Cl.
*H01M 4/02* (2006.01)
*H01B 1/06* (2006.01)
(52) U.S. Cl. .................. 429/221; 429/231.95; 252/519.1
(58) Field of Classification Search .................. 429/221, 429/231.95; 252/519.1, 521.2, 521.5; 423/472
See application file for complete search history.

(56) References Cited

U.S. PATENT DOCUMENTS

| | | | |
|---|---|---|---|
| 3,699,145 A | 10/1972 | Sianesi et al. | |
| 5,536,599 A | 7/1996 | Alamgir et al. | |
| 5,709,968 A | 1/1998 | Shimizu | |
| 5,763,119 A | 6/1998 | Adachi | |
| 5,858,573 A | 1/1999 | Abraham et al. | |
| 5,858,576 A | 1/1999 | Takashi et al. | |
| 5,882,812 A | 3/1999 | Visco et al. | |
| 6,004,698 A | 12/1999 | Richardson et al. | |
| 6,045,952 A | 4/2000 | Kerr et al. | |
| 6,203,944 B1 | 3/2001 | Turner et al. | |
| 6,255,017 B1 | 7/2001 | Turner | |
| 6,387,570 B1 | 5/2002 | Nakamura et al. | |
| 6,387,571 B1 | 5/2002 | Lain et al. | |
| 6,436,578 B2 | 8/2002 | Turner et al. | |
| 6,780,544 B2 | 8/2004 | Noh | |
| 7,341,804 B2 | 3/2008 | Christensen | |
| 7,344,659 B2 * | 3/2008 | Ravet et al. | 252/518.1 |
| 7,371,338 B2 * | 5/2008 | Amatucci | 252/518.1 |
| 7,498,100 B2 | 3/2009 | Christensen et al. | |
| 2005/0208378 A1 | 9/2005 | Mizutani et al. | |
| 2005/0221168 A1 | 10/2005 | Dahn et al. | |
| 2005/0221196 A1 | 10/2005 | Dahn et al. | |
| 2006/0046144 A1 | 3/2006 | Obrovac | |
| 2006/0263697 A1 | 11/2006 | Dahn et al. | |
| 2007/0020521 A1 | 1/2007 | Obrovac et al. | |

(Continued)

FOREIGN PATENT DOCUMENTS

EP  0 557 167 A1  8/1993

(Continued)

OTHER PUBLICATIONS

Tasaki, "Solvent Decompositions and Physical Properties of Decomposition Compounds in Li-Ion Battery Electrolytes Studies by DFT Calculations and Molecular Dynamics Simulations," *J. Phys. Chem. B*, 109 pp. 2920-2933, (2005).

(Continued)

*Primary Examiner* — Mark Kopec
(74) *Attorney, Agent, or Firm* — Stephen F. Wolf

(57) ABSTRACT

Compositions useful for cathodes in lithium-ion batteries are described. In some examples, an electrochemical cell includes an electrode, the electrode comprising a composition including the elements of Li, Fe, and F, where the composition includes a first phase including a disordered trirutile structure. Cathodes including such a composition may exhibit reversible reactivity with lithium. In some examples, this reaction takes place via an intercalation mechanism.

21 Claims, 15 Drawing Sheets

U.S. PATENT DOCUMENTS

| | | | |
|---|---|---|---|
| 2007/0020522 | A1 | 1/2007 | Obrovac et al. |
| 2007/0020528 | A1 | 1/2007 | Obrovac et al. |
| 2007/0128517 | A1 | 6/2007 | Christensen et al. |
| 2007/0269718 | A1 | 11/2007 | Krause et al. |
| 2008/0311464 | A1 | 12/2008 | Krause et al. |
| 2009/0195103 | A1 | 8/2009 | Moeller |
| 2009/0286162 | A1 | 11/2009 | Lamanna et al. |

FOREIGN PATENT DOCUMENTS

| | | | |
|---|---|---|---|
| WO | WO 2008/097723 A1 | 8/2008 | |

OTHER PUBLICATIONS

Liao et al., "Combinatorially Prepared [LiF]$Fe_x$ Nanocomposites for Positive Electrode Materials in Li-Ion Batteries", *Chemistry of Materials*, vol. 20, pp. 454-461, (2008).

Badway et al., "Carbon Metal Fluoride Nanocomposites; High-Capacity Reversible Metal Fluoride Conversion Materials as Rechargeable Positive Electrodes for Li Batteries", *Journal of the Electrochemical Society*, vol. 150 (10), pp. A1318-A1327, (2003).

Badway et al., "Carbon-Metal Fluoride Nanocomposites; Structure and Electrochemistry of $FeF_3$ :C", *Journal of The Electrochemical Society*, vol. 150, pp. A1209-1218, (2003).

Li et al., "Li-Storage via Heterogeneous Reaction in Selected Binary Metal Fluorides and Oxides", *Journal of the Electrochemical Society*, vol. 151, pp. A1878A1885, (2004).

Doe et al., "First-Principles Investigation of the Li-Fe-F Phase Diagram and Equilibrium and Nonequilibrium Conversion Reactions of IronFluorides with Lithium", *Chemistry of Materials*, vol. 20, pp. 5274-5283, (2008).

Yamakawa et al., "Identifying the Local Structures Formed during Lithiation of the Conversion Material, Iron Fluoride, in a Li Ion Battery: A Solid-State NMR, X-ray Diffraction, and Pair Distribution Function Analysis Study", *JACs Articles*, Jul. 8, 2009.

Gocheva et al., "Properties of $Li_2TiF_6$ As Cathode Material in Rechargeable Batteries", *IMLB*, Abstract # 349, (2008).

Dahn et al.,"Intercalation-based Trirutile or Disordered Trirutile Structure $Li_{1+n}Fe_2 2F_{6+n}$ Positive Electrode Materialsfor Li-ion Batteries", Mar. 17-18, 2009.

\* cited by examiner

US 8,137,841 B2

CATHODE COMPOSITIONS FOR LITHIUM-ION ELECTROCHEMICAL CELLS

TECHNICAL FIELD

The disclosure relates to lithium-ion batteries and, in particular, compositions useful for cathodes in lithium-ion batteries.

BACKGROUND

Secondary lithium-ion batteries typically include an anode, an electrolyte, and a cathode that contains lithium in the form of a lithium-transition metal oxide. Examples of transition metal oxides that have been used in cathodes include lithium transition metal oxides that comprise various amounts of cobalt, nickel, and manganese. However, not all transition metal oxide cathode materials exhibit an optimal combination of high initial capacity, high thermal stability, and good capacity retention after repeated charge-discharge cycling.

SUMMARY

In general, the disclosure relates to compositions and electrodes for use in lithium-ion electrochemical cells and, more particularly, compositions for cathodes of electrochemical cells. As used herein, the term cathode is used to refer to the positive electrode of an electrochemical cell. Example cathodes include compositions including the elements of Li, Fe, and F, and a phase having a disordered trirutile structure. Cathodes including a composition including Li, Fe, and F, and a phase including a disordered trirutile structure may exhibit reversible reactivity with lithium. In a preferred example, this reaction takes place via an intercalation mechanism.

In one embodiment, the disclosure is directed to an electrochemical cell including an electrode, the electrode comprising a composition comprising the elements of Li, Fe, and F, wherein the composition includes a first phase having a disordered trirutile structure.

In another embodiment, the disclosure is directed to a method including forming a composition comprising the elements of Li, Fe, and F, the composition having a first phase including a disordered trirutile structure.

The details of one or more embodiments of the invention are set forth in the accompanying drawings and the description below. These and various other features and advantages will be apparent from a reading of the following detailed description.

DETAILED DESCRIPTION

Figure 1:
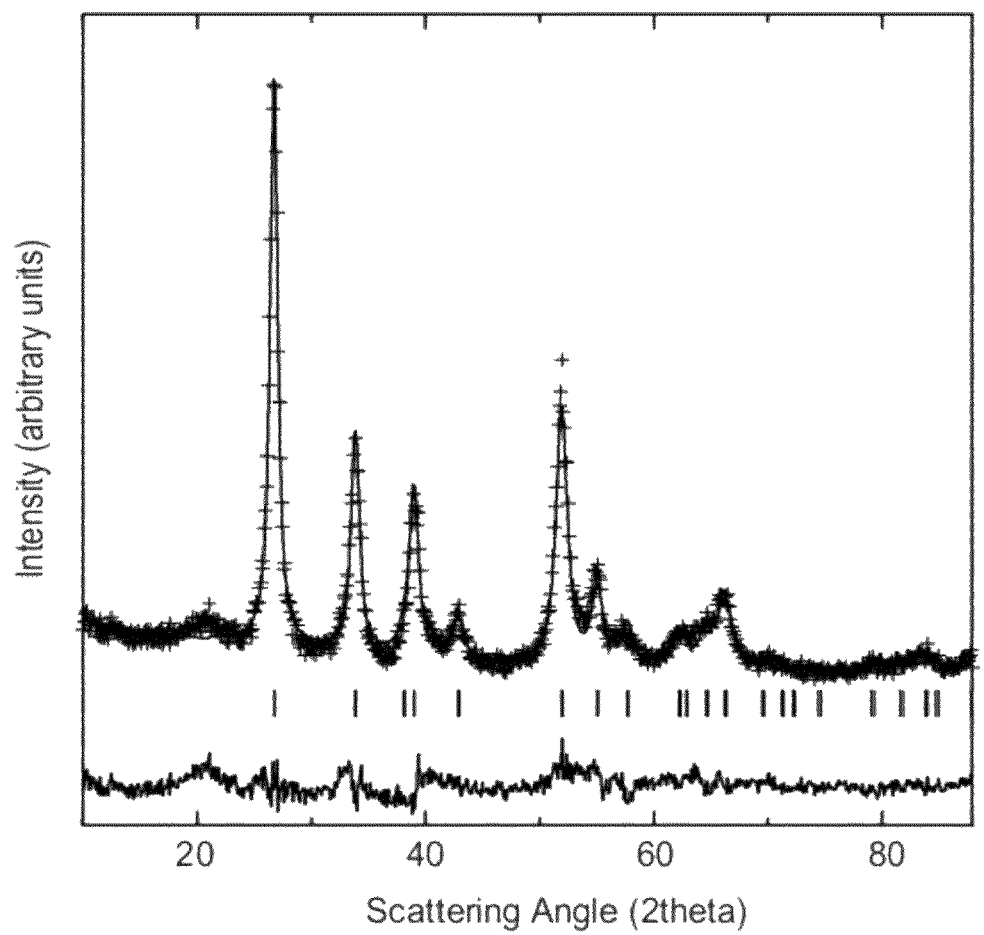
FIG. 1 is a plot illustrating the x-ray diffraction pattern measured for an example $LiFe_2F_6$ composition.

In general, the disclosure relates to compositions and electrodes for use in lithium-ion electrochemical cells and, more particularly, compositions for cathodes (positive electrodes) of electrochemical cells. Example cathodes include a composition including the elements of Li, Fe, and F (e.g., compositions having the formula $Li_xFe_yF_z$), and a phase having a disordered trirutile structure. Cathodes including a composition including Li, Fe, and F, and a phase including a disordered trirutile structure may exhibit reversible reactivity with lithium. In a preferred example, this reaction takes place via an intercalation mechanism.

For purposes of describing examples of the disclosure, compositions comprising the elements of Li, Fe, and F may be referred to as LiFeF compositions. However, such terminology should not be interpreted to limit such compositions to any particular chemical formula (e.g., composition having the formula LiFeF) or ratio of the respective elements within the composition beyond that of any composition that comprises the elements of Li, Fe, and F.

Lithium-ion batteries are widely used in portable electronics and show a promising future for use in electrical vehicles. In some cases, a lithium-ion battery includes a cathode electrode that contains lithium in the form of a lithium-transition metal oxide. However, specific capacities achievable in lithium-ion batteries having lithium transition metal oxide cathodes are approaching a "capacity wall," which limits the energy density of lithium-ion batteries including such cathodes. Furthermore, lithium-transition metal oxide cathode compositions may exhibit less than desirable thermal stability.

In accordance with some examples of the disclosure, a cathode may comprise a LiFeF composition having a phase including a disordered trirutile structure. Cathodes including a LiFeF composition having a phase including a disordered trirutile structure may be incorporated in lithium-ion batteries to provide for an electrochemical cell having a relatively high specific capacity. Example cathode compositions may also provide for a cathode with desirable thermal stability. Moreover, as iron (Fe) and fluorine (F) are generally found in great natural abundance, raw material costs associated with the production of such cathodes may be relatively low.

In general, the disordered trirutile (which may also be referred to as "cation-disordered" trirutile) structure of a LiFeF composition may be substantially similar to that of the basic trirutile structure except that cations (e.g., $Li^+$, $Fe^{2+}$, and $Fe^{3+}$) within the structure are seemingly located randomly along the metal chains of the structure. Trirutile $LiFe_2F_6$ is built up of $Fe^{2+}F_6$, $LiF_6$ and $Fe^3F_6$ octahedra that shares edges along the c direction and corners in the ab plane, with tunnels along the (001) direction. Trirutile $Li_xFe_yF_z$ is isostructural to rutile ($TiO_2$) except for the ordering of the $Li^+$, $Fe^{2+}$, and $Fe^{3+}$ cations along the metal atom chains aligned with the c direction of the structure.

As will be apparent from the following description and examples, disordered trirutile LiFeF compositions may exhibit reversible reactivity with lithium. Although not wishing to be limited by theory, it is believed that $Li^+$ ions can be intercalated into the tunnels of the disordered trirutile structure in a substantially reversible manner. As such, the reaction may be defined as a reversible intercalation reaction as opposed to a displacement reaction. Compared to that of a displacement reaction, which generally does not exhibit desirable reversibility, intercalation reactions exhibit advantageous reversibility, allowing for an electrochemical cell with relatively long charge-discharge cycle life.

As described above, in some examples, a disordered trirutile LiFeF composition may have a chemical formula $Li_xFe_yF_z$, where the respective values for x, y, and z are such that the composition has a phase including a disordered trirutile structure. In some examples, using a value of approximately 2 for y as a reference, the value of x may be greater than approximately 0.4 but less than approximately 2.5, and the value of z may be greater than approximately 5.5 but less than approximately 6.5. For example, with y equal to approximately 2, the value of x may be greater than approximately 0.5 but less than approximately 2.2 and the value of z may be greater than approximately 5.8 but less than approximately 6.3. However, all values for x, y, and z for a composition having the formula $Li_xFe_yF_z$ that has a phase including a disordered trirutile structure are contemplated.

Due to the intercalation and extraction of lithium from example disordered trirutile structures, particular values of x in the formula $Li_xFe_yF_z$ may vary in a cathode composition as lithium ions are inserted and extracted from the disordered trirutile structure. As an illustration, a cathode may include a $Li_{1+a}Fe_2F_6$ composition having a disordered trirutile structure. In such an example, lithium ions may be reversibly intercalated into disordered trirutile structure (e.g., into the tunnels of the disordered trirutile structure) such that $0 < a < 1.0$, such as, e.g., $0 < a < 0.6$, in a single phase region. Conversely, Li atoms can be removed from the metal atom chains for $Li_{1-b}Fe_2F_6$ such that $0 \leq b \leq 0.5$. In some examples, it may be possible for values of b to approach approximately 1.0, although a theoretical limit exists at the point where collapse of the disordered trirutile structure occurs. As such, in some examples, for a cathode electrode including a disordered trirutile phase composition having the formula $Li_xFe_2F_6$, the value of x may range from approximately 0.5 to approximately 2.0, such as, e.g., from approximately 0.5 to approximately 1.6. In some examples, a cathode including disordered trirutile phase $LiFe_2F_6$ can intercalate an additional one lithium atom per formula unit. Additionally, almost one lithium atom per formula unit can be extracted from the original structure of the $LiFe_2F_6$ composition. Assuming that approximately two lithium atoms per formula unit may be reversibly reacted, a theoretical capacity of approximately 224 mAh/g may be exhibited. The cathode composition may maintain a disordered trirutile structure during the intercalation and extraction of Li from the cathode composition.

Examples of the disclosure are not limited to any specific ratios between x, y, and z in the formula $Li_xFe_yF_z$, but instead includes all values for x, y, and z in which the composition forms a disordered trirutile structure. The disordered trirutile structure may provide for lithium intercalation into the structure and also lithium extraction from the structure composition, e.g., during discharge and charge when the cathode is incorporated into an electrochemical cell. As illustrated in the example above, in some examples the ratio of z to y may be approximately 3:1 (e.g., $Li_xFe_2F_6$), with the value of x varying with the intercalation and extraction of lithium from the disordered trirutile structure. In other examples, the ratio of z to y may be greater than 3:1, e.g., approximately 3:1 to approximately 3.5:1.

In some examples, a cathode electrode may include a composition with a disordered trirutile structure and having the formula $Li_{1+n}Fe_2F_{6+n}$. For example, the value of n may range from approximately 0 to approximately 1.0, such as, e.g., where n is equal to approximately 0.2, approximately 0.5, or approximately 0.8. In such an example, the ratio of LiF to Fe used in syntheses involving the reactants LiF, $FeF_2$ and $FeF_3$ may be greater than that of the 1:1 ratio used in compositions having the formula $LiFe_2F_6$. In some examples, varying the ratio of LiF to Fe may influence the specific capacity of cathodes including the cathode composition having the formula $Li_{1+n}Fe_2F_{6+n}$. In some examples, cathode compositions having the formula $Li_{1+n}Fe_2F_{6+n}$, where n is greater than zero may form one or more phases other than that of disordered trirutile phase. For example, a cathode composition having the formula $Li_{1+n}Fe_2F_{6+n}$, wherein n is greater than zero may form a mixture of $LiFe_2F_6$ and $Li_3FeF_6$ phases. The presence of one or more phases in the composition in addition to that of a phase including a disordered trirutile structure may increase the specific capacity of the cathode composition. In some examples, the presence of the second phase may reduce the size of the grains of the disordered trirutile phase, leading to enhanced lithium transport.

In some examples, disordered trirutile LiFeF compositions may include one or more substituents in addition to the elements of Li, Fe, and F in the disordered trirutile structure. For example a LiFeF composition may be doped with one or more 3d transition metal elements, such as, e.g., Ti, Cr, Mn, Co, Ni, and/or Cu, where the composition has a phase including a disordered trirutile structure. Other suitable substituents are contemplated.

In some examples, the provided cathode compositions may be formed via a high-energy ball milling process that the combines of appropriate amounts of Li, F, and Fe to form a LiFeF composition where the composition includes a phase having disordered trirutile structure. For example, mixtures of LiF, $FeF_2$ and/or $FeF_3$ may be high-energy ball milled to form one or more of the example cathode compositions describe herein. Using the disordered trirutile LiFeF composition formed via the high-energy ball milling process, a cathode may be formed via one or more suitable techniques, including those described below. In this manner, the cathode may be initially incorporated into an electrochemical cell, such as, e.g., a lithium-ion battery, when the cathode includes a composition having lithium atoms within the composition prior to initial charge or discharge of the cell. In some cases, it may be possible for a composition having an initial $FeF_3$ composition to be lithiated to form a composition having the formula $Li_xFeF_3$ (e.g., via an electrochemical reaction with a lithium-containing electrode), where the $Li_xFeF_3$ composition does not have a disordered trirutile structure. Accordingly, high-energy ball milling may provide a process for forming compositions having disordered trirutile phase, although other suitable techniques which form disordered trirutile phase LiFeF compositions may be used in some examples. Moreover, high energy ball milling may allow for flexibility in the amounts of Li, F and Fe in the cathode composition used to form at least a portion the cathode electrode. For example, while not limited to such a process, high energy ball milling may be used to form cathode compositions with excess lithium by varying the amount of Li, F and Fe provided for milling. Other production processes that may be used to form disordered trirutile LiFeF compositions include, but are not necessarily limited to, mechanical attriting, roller milling and pebble milling.

In some examples, the provided cathode compositions can have relatively high capacity (mAh/g) retention when made into a cathode, incorporated into an electrochemical cell (e.g., a lithium-ion battery), and cycled through multiple charge/discharge cycles. For example, the provided cathode composition can have a specific capacity of greater than approximately 140 mAh/g, such as, e.g., greater than approximately 160 mAh/g or greater than approximately 180 mAh/g. In other embodiments the provided cathode compositions may maintain high specific capacity after 50, after 75, after 90, after 100, or even more charging and discharging cycles at rates of C/4 when the battery is cycled between about 2.5 V and about 4.5 V vs. Li/Li$^+$ and the temperature is maintained at about room temperature (25° C.).

To make a cathode from the provided disordered trirutile LiFeF compositions, the provided LiFeF composition, any selected additives such as, e.g., binders, conductive diluents, fillers, adhesion promoters, thickening agents for coating viscosity modification (e.g., carboxymethylcellulose) and other additives known by those skilled in the art can be mixed in a suitable coating solvent such as N-methylpyrrolidinone (NMP) to form a coating dispersion or coating mixture. The coating dispersion can be mixed thoroughly and then applied to a foil current collector by any appropriate coating technique such as knife coating, notched bar coating, dip coating, spray coating, electrospray coating, or gravure coating. The current collectors can typically be thin foils of conductive metals such as, for example, aluminum foil. The dispersion or mixture can be coated onto the current collector foil and then allowed to dry in air followed usually by drying in a heated oven, typically at about 80° C. to about 300° C. for about an hour to remove the solvent.

Cathodes made from the provided example LiFeF compositions may include a binder. Exemplary polymer binders include polyolefins such as those prepared from ethylene, propylene, or butylene monomers; fluorinated polyolefins such as those prepared from vinylidene fluoride monomers; perfluorinated polyolefins such as those prepared from hexafluoropropylene monomer; perfluorinated poly(alkyl vinyl ethers); perfluorinated poly(alkoxy vinyl ethers); aromatic, aliphatic, or cycloaliphatic polyimides, or combinations thereof. Specific examples of polymer binders include polymers or copolymers of vinylidene fluoride, tetrafluoroethylene, and propylene; and copolymers of vinylidene fluoride and hexafluoropropylene.

An electrode composition can include an electrically conductive diluent to facilitate electron transfer from the composition to a current collector. The conductive diluent can be added to the electrode composition that comprises Li, Fe, and F in order to increase the contact of the composition with the current collector. Electrically conductive diluents include, but are not limited to, carbon (e.g., carbon black for negative electrodes and carbon black, flake graphite and the like for positive electrodes), metal, metal nitrides, metal carbides, metal silicides, and metal borides. Representative electrically conductive carbon diluents include carbon blacks such as SUPER P and SUPER S carbon blacks (both from MMM Carbon, Belgium), SHAWANIGAN BLACK (Chevron Chemical Co., Houston, Tex.), acetylene black, furnace black, lamp black, graphite, carbon fibers and combinations thereof.

In some embodiments, a cathode can include an adhesion promoter that promotes adhesion of the cathode composition and/or electrically conductive diluent to the binder. The combination of an adhesion promoter and binder can help the cathode composition better accommodate volume changes that can occur in the powdered material during repeated lithiation/delithiation cycles. Binders can offer sufficiently good adhesion to metals and alloys so that addition of an adhesion promoter may not be needed. If used, an adhesion promoter can be made a part of a lithium polysulfonate fluoropolymer binder (e.g., in the form of an added functional group), such as those disclosed in PCT Publ. No. WO 2008/097723 (Pham et al.), can be a coating on the powdered material, can be added to the electrically conductive diluent, or can be a combination thereof. Examples of useful adhesion promoters include silanes, titanates, and phosphonates as described in U.S. Pat. No. 7,341,804 (Christensen).

Example LiFeF compositions of this disclosure may be present in a cathode in any suitable amount. In some examples, a cathode may include at least 60 wt % of a disordered trirutile LiFeF composition. For example, the amount of disordered trirutile LiFeF composition present in an example cathode may range from approximately 70 to approximately 99 wt. %, such as, e.g., approximately 85 to 90 wt. %.

Electrodes made from example disordered trirutile LiFeF compositions of this disclosure can be combined with an anode and an electrolyte to form a lithium-ion electrochemical cell or a battery pack from two or more electrochemical cells. Examples of suitable anodes can be made from compositions that include lithium, carbonaceous materials, silicon alloy compositions and lithium alloy compositions. Exemplary carbonaceous materials can include synthetic graphites such as mesocarbon microbeads (MCMB) (available from E-One Moli/Energy Canada Ltd., Vancouver, BC), SLP30 (available from TimCal Ltd., Bodio Switzerland), natural graphites and hard carbons. Useful anode materials can also include alloy powders or thin films. Such alloys may include electrochemically active components such as silicon, tin, aluminum, gallium, indium, lead, bismuth, and zinc and may also comprise electrochemically inactive components such as iron, cobalt, transition metal silicides and transition metal aluminides. Useful alloy anode compositions can include alloys of tin or silicon such as Sn—Co—C alloys, $Si_{60}Al_{14}Fe_8TiSn_7Mm_{10}$ and $Si_{70}Fe_{10}Ti_{10}C_{10}$ where Mm is a Mischmetal (an alloy of rare earth elements). Metal alloy compositions used to make anodes can have a nanocrystalline or amorphous microstructure. Such alloys can be made, for example, by sputtering, ball milling, rapid quenching, or other means. Useful anode materials also include metal oxides such as $Li_4Ti_5O_{12}$, $WO_2$, and tin oxides. Other useful anode materials include tin-based amorphous anode materials such as those disclosed in U.S. Pat. Appl. No. 2005/0208378 (Mizutani et al.).

Exemplary silicon alloys that can be used to make suitable anodes include compositions that comprise from about 65 to about 85 mol % Si, from about 5 to about 12 mol % Fe, from about 5 to about 12 mol % Ti, and from about 5 to about 12 mol % C. Additional examples of useful silicon alloys include compositions that include silicon, copper, and silver or silver alloy such as those discussed in U.S. Pat. Publ. No. 2006/0046144 A1 (Obrovac et al.); multiphase, silicon-containing electrodes such as those discussed in U.S. Pat. No. 7,498,100

(Christensen et al.); silicon alloys that contain tin, indium and a lanthanide, actinide element or yttrium such as those described in U.S. Pat. Publ. Nos. 2007/0020521, 2007/0020522, and 2007/0020528 (all to Obrovac et al.); amorphous alloys having a high silicon content such as those discussed in U.S. Pat. Publ. No. 2007/0128517 (Christensen et al.); and other powdered materials used for negative electrodes such as those discussed in U.S. Pat. Publ. No. 2007/0269718 (Krause et al.) and U.S. Pat. Publ. No. 2008/311464 (Krause et al.). Anodes can also be made from lithium alloy compositions such as those of the type described in U.S. Pat. Nos. 6,203,944 and 6,436,578 (both to Turner et al.) and in U.S. Pat. No. 6,255,017 (Turner).

Provided electrochemical cells can include an electrolyte. A variety of electrolytes can be employed. Representative electrolytes can contain one or more lithium salts and a charge-carrying medium in the form of a solid, liquid or gel. Exemplary lithium salts are stable in the electrochemical window and temperature range (e.g. from about −30° C. to about 70° C.) within which the cell electrodes can operate, are soluble in the chosen charge-carrying media, and perform well in the chosen lithium-ion cell. Exemplary lithium salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof. Exemplary solid electrolytes include polymeric media such as polyethylene oxide, fluorine-containing copolymers, polyacrylonitrile, combinations thereof, and other solid media that will be familiar to those skilled in the art. Exemplary liquid electrolytes include ethylene carbonate, propylene carbonate, dimethyl carbonate, diethyl carbonate, ethyl-methyl carbonate, butylene carbonate, vinylene carbonate, fluoroethylene carbonate, fluoropropylene carbonate, γ-butylrolactone, methyl difluoroacetate, ethyl difluoroacetate, dimethoxyethane, diglyme (bis(2-methoxyethyl)ether), combinations thereof and other media that will be familiar to those skilled in the art. Exemplary electrolyte gels include those described in U.S. Pat. Nos. 6,387,570 (Nakamura et al.) and 6,780,544 (Noh). The solubilizing power of the electrolyte can be improved through addition of a suitable cosolvent. Exemplary cosolvents include aromatic materials compatible with Li-ion cells containing the chosen electrolyte. Representative cosolvents include sulfolane, dimethoxyethane, combinations thereof and other cosolvents that will be familiar to those skilled in the art. The electrolyte can include other additives that will familiar to those skilled in the art. For example, the electrolyte can contain a redox chemical shuttle such as those described in U.S. Pat. Nos. 5,709,968 (Shimizu), 5,763,119 (Adachi), 5,536,599 (Alamgir et al.), 5,858,573 (Abraham et al.), 5,882,812 (Visco et al.), 6,004,698 (Richardson et al.), 6,045,952 (Kerr et al.), and 6,387,571 B1 (Lain et al.); and in U.S. Pat. Appl. Publ. Nos. 2005/0221168, 2005/0221196, and 2006/0263697 (all to Dahn et al.). Particularly preferred are redox chemical shuttles that can be useful for high voltage cathode materials and which are disclosed, for example, in U.S. Ser. No. 12/366,022, filed Feb. 5, 2009.

Provided electrochemical cells can be made by taking at least one each of a positive electrode (cathode) and a negative electrode (anode) as described above and placing them in an electrolyte. Typically, a microporous separator, such as CELGARD 2400 microporous material, available from Hoechst Celanese Corp., Charlotte, N.C., can be used to prevent the contact of the negative electrode directly with the positive electrode. This can be especially important in coin cells such as, for example, 2325 coin cells as known in the art.

The disclosed electrochemical cells can be used in a variety of devices, including portable computers, tablet displays, personal digital assistants, mobile telephones, motorized devices (e.g., personal or household appliances and vehicles), instruments, illumination devices (e.g., flashlights) and heating devices. One or more electrochemical cells of this invention can be combined to provide battery pack. Further details regarding the construction and use of rechargeable lithium-ion cells and battery packs will be familiar to those skilled in the art.

Various aspects of some embodiments of the present disclosure are further illustrated by the following examples. However, the particular materials and amounts thereof recited in these examples, as well as other conditions and details, should not be construed to unduly limit this disclosure.

EXAMPLES

Example A $LiFe_2F_6$ and $LiMgFeF_6$ Cathode Compositions

Synthesis

Figure 6:
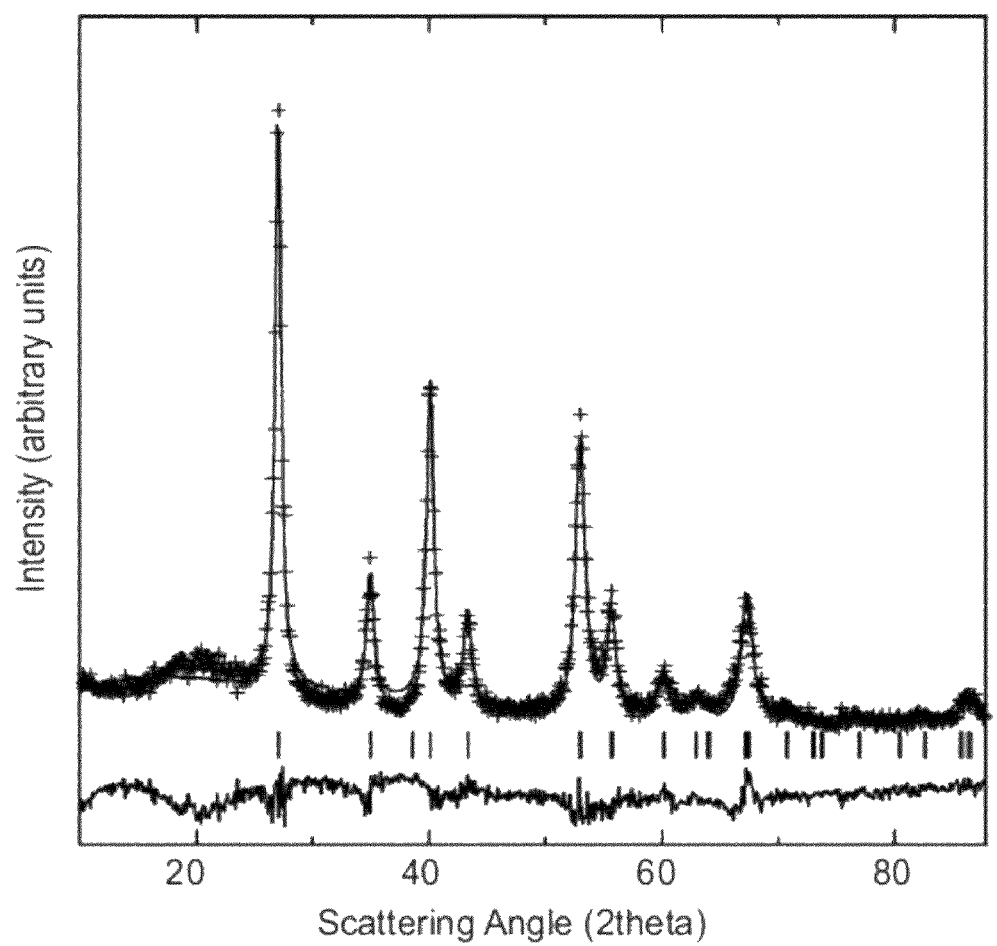
FIG. 6 is a plot illustrating the x-ray diffraction pattern measured for an example $LiMgFeF_6$ composition.

A $LiFe_2F_6$ sample composition (Example 1) and a LiMgFeF6 sample composition (Example 2) were synthesized using a Spex 8000 high-energy ball mill. The respective samples were prepared from stoichiometric mixtures of LiF (Sigma Aldrich, precipitated, 99.995%), $FeF_2$ (Sigma Aldrich, 98%) or $MgF_2$ (Sigma Aldrich, pieces, 3-6 mm, 99.9% metals basis) and $FeF_3$ (Alfa Aesar, anhydrous, 97% min). The high-energy ball milling was performed in hardened steel vials with four approximately 0.5 inch diameter hardened steel balls added. The milling vials were loaded with a total mass of approximately 4 grams of the reactants in an argon-filled glove box. After approximately 40 hours of milling, the steel vials were opened in the glove box and a sample of the composition was extracted for x-ray diffraction. FIGS. 1 and 6 are plots showing the x-ray diffraction patterns measured for Example 1 and Example 2, respectively. The x-ray diffraction patterns shown in FIGS. 1 and 6 will be discussed in greater detail below.

In order to increase the electronic conductivity of $LiFe_2F_6$ and $LiMgFeF_6$ before making electrodes, approximately 85 wt. % $LiFe_2F_6$ (or LiMgFeF6) was high-energy ball-milled for about 1 hour with approximately 15 wt. % Super-S carbon black. Then this $LiFe_2F_6$/carbon composite active material was mixed with approximately 7 wt. % Super-S carbon black (MMM Carbon, Belgium) and approximately 7 wt. % PVDF binder dissolved in NMP solvent to make the electrode slurry. Electrodes were spread on Al foil using a notch bar spreader and then dried at approximately 90 degrees Celsius for 12 hours before use. Electrodes were punched into 12 mm diameter discs using a precision punch.

2325 size (23 mm diameter, 2.5 mm thick) coin-type cells were used for electrochemical characterizations and for in-situ XRD experiments. The $LiFe_2F_6$ electrode on Al foil, three Celgard 2300 separators and a lithium foil common counter and reference electrode were assembled into the coin cell hardware in an argon-filled glove box. 1M LiPF6 in EC:DEC [1:2 v/v] solution was used as electrolyte. The special cells used for the in-situ XRD experiment are the same as the standard 2325 cell except that the electrode slurry was coated onto a Be window (23 mm diam., 0.25 mm thick) instead of Al foil. The Be window was mounted over a 15 mm diameter hole in the cell can so that X-rays could penetrate the Be window and reach the $LiFe_2F_6$ active material. To prevent leaking, a thin layer of Torr Seal (Varian Co.) was applied to the joint between the Be window and the coin cell can.

After assembly, the coin cells were charged and discharged between 2.5 V and 4.0 V, or between 2.0 V and 4.5 V, as noted. The cells were first charged to the high voltage limit in an attempt to extract lithium, then discharged to the low voltage limit. This was done at a C/12 rate, as calculated using the expected theoretical capacity corresponding to the removal of one Li atom per formula unit of $LiFe_2F_6$. The cell for the in-situ XRD experiment was discharged and charged between 2.0 V and 5.2 V at a C/60 rate.

XRD patterns of the $LiFe_2F_6$ and $LiMgFeF_6$ powders (FIGS. 1 and 6, respectively) were collected using a Siemens D-5000 diffractometer equipped with a Cu-target X-ray tube and a diffracted-beam monochromator. Each X-ray scan was collected in air from approximately 10 to 90 degrees in 0.05° increments at 35 s/point.

In-situ XRD experiments were made with a JD2000 diffractometer equipped with a Cu target X-ray tube and a diffracted beam monochromator. Each in-situ X-ray scan was collected at 30s/point in 0.05° increments between scattering angles of 15.0° and 45.0°.

Evaluation

FIG. 1 is a plot illustrating the x-ray diffraction pattern measured for the sample $LiFe_2F_6$ composition (Example 1). In order to identify the structure of the obtained phase, a powder pattern calculation and subsequent refinement of the measured XRD pattern was made with Rietica software. In a crystalline trirutile structure, $Li^+$, $Fe^{2+}$ and $Fe^{3+}$ ions are ordered along the (001) direction. According to the Rietveld calculation, this ordering produces superlattice peaks in the XRD pattern. However, these superlattice peaks were not observed in the experimental XRD pattern shown in FIG. 1. To compare the XRD pattern of FIG. 1 to disordered trirutile structure, the basic rutile structure was used in the Rietveld refinement but the Li and Fe atoms were assigned to the cation position in the basic rutile structure with ⅓ and ⅔ occupation, respectively. Such a structure may also be referred to as the "cation-disordered" $LiFe_2F_6$ structure. The solid line in FIG. 1 shows the refined calculation, which agrees well with the experimental XRD pattern. The full width at half maximum of the $LiFe_2F_6$ (110) peak is about 0.81 degrees, which leads to a 10 nm grain size according to Scherrer's equation. Although not wishing to be limited by theory, it is reasonable to suggest that the cations in Example 1 were mixed randomly along the metal atom chains of the structure due at least in part to the high-energy ball milling synthesis method.

In order to increase the electronic conductivity of the $LiFe_2F_6$ powder, 85 wt. % $LiFe_2F_6$ powder (Example 1) was high-energy ball-milled with 15 wt. % Super-S carbon black. The XRD pattern collected from the product was nominally identical to that of the $LiFe_2F_6$ phase (FIG. 1) indicating that high energy ball-milling with Super-S carbon did not destroy the disordered trirutile structure. After low-energy ball milling with Super-S carbon and PVDF dissolved in NMP to make the electrode slurry and after drying in air for about 12 hours, the XRD pattern collected from the finished electrode was still the same as that in FIG. 1 suggesting that $LiFe_2F_6$ is stable in air, at least for 12 hours.

Figure 2A:
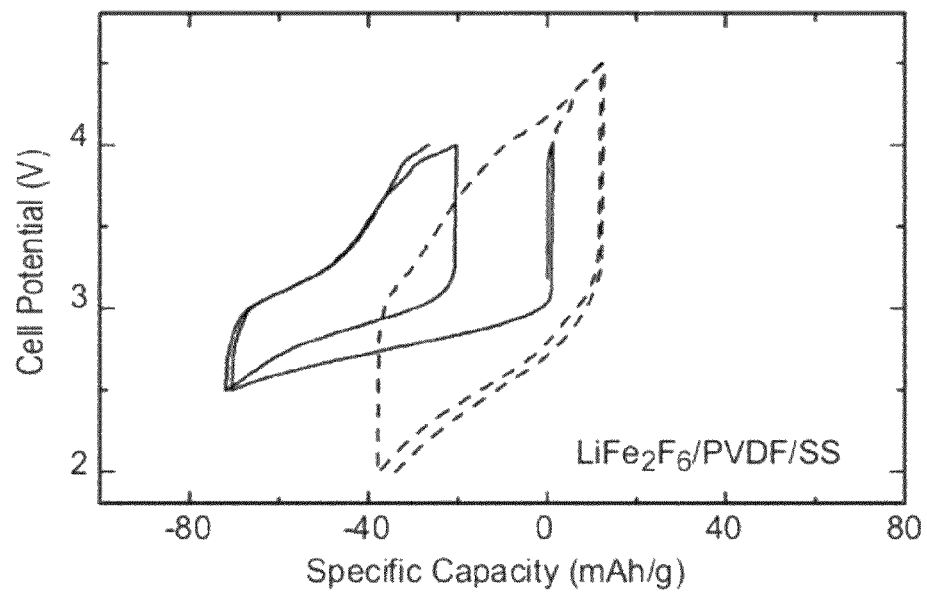
FIGS. 2a and 2b are plots illustrating charge/discharge profiles measured for two example $Li/LiFe_2F_6$ cells.

FIG. 2a shows the charge and discharge profiles for a $Li/LiFe_2F_6$ cell with a positive electrode containing 86% $LiFe_2F_6$, 7% Super-S carbon and 7% PVDF. Two different voltage ranges were investigated, 2.5 to 4.0 V (black solid curve) and 2.0 to 4.5 V (black dashed curve). The electrochemical activity of the cathode electrode described by FIG. 2a was relatively poor.

Figure 2B:
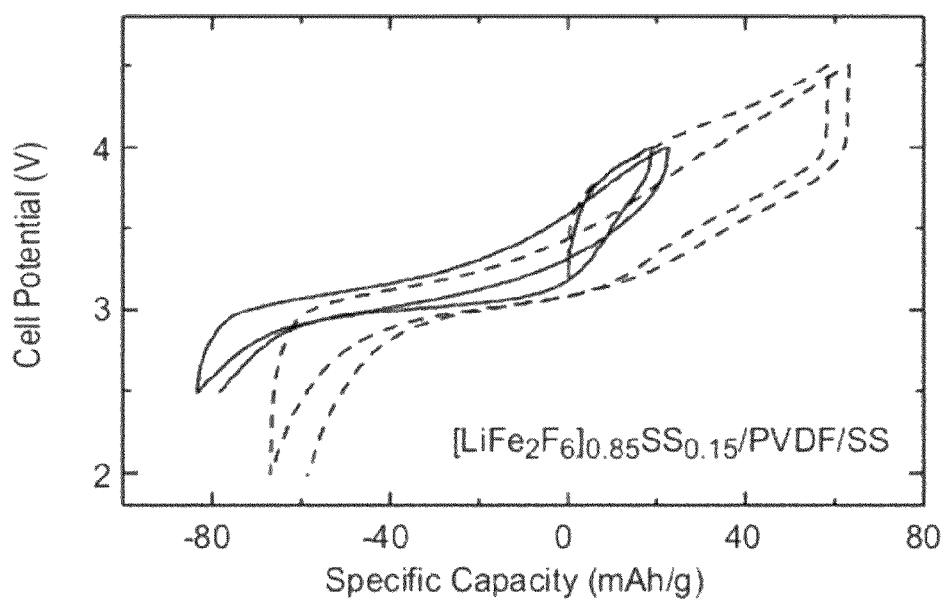

FIG. 2b shows the charge and discharge profile for a $Li/LiFe_2F_6$ cell with an electrode made of the $LiFe_2F_6$ that had been high energy ball milled with 15% carbon prior to electrode fabrication. A clear reversible plateau was observed around 3.2 V, as shown in FIG. 2b. Based on the rutile structure of cation-disordered $LiFe_2F_6$ (or disordered trirutile structure), this plateau may correspond to the intercalation (during discharge) and de-intercalation (during charge) of Li into the tunnels parallel to the (001) direction. During the first charge to 4.0 V, only about 16 mAh/g specific capacity was obtained. However, after raising the upper cut-off potential to 4.5V, a specific charge capacity of about 58 mAh/g was obtained, which showed reversibility during discharge. Presumably, this capacity arises from the extraction and re-insertion of Li atoms from the metal atom chains.

In order to verify these explanations of the potential-capacity profile, in-situ XRD was carried out to study the structural changes in $Li_{1+x}Fe_2F_6$ and $Li_iFe_2F_6$ that occur as the $Li/LiFe_2F_6$ cells are discharged and charged.

Figure 3A:
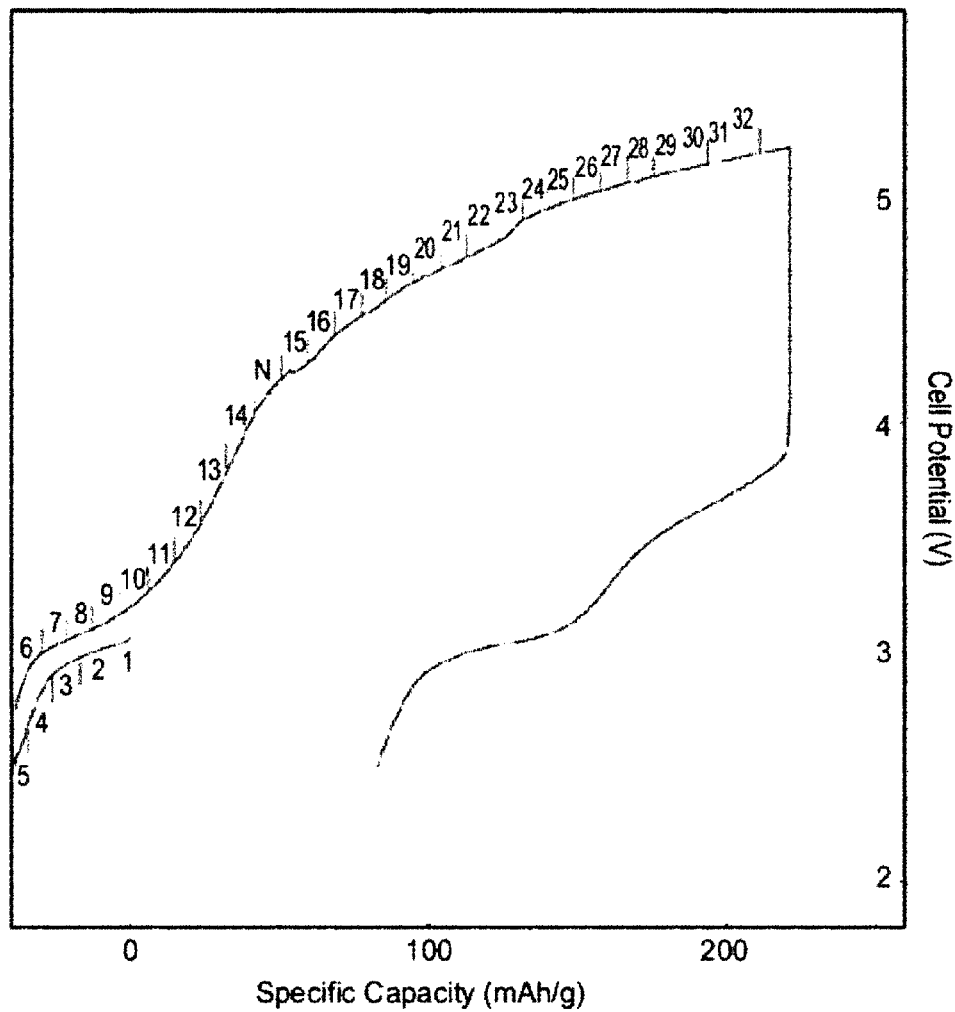
FIGS. 3a and 3b are plots illustrating in-situ x-ray diffraction patterns measured for an example $Li/LiFe_2F_6$ cell during the first discharge-charge cycle.
Figure 3B:
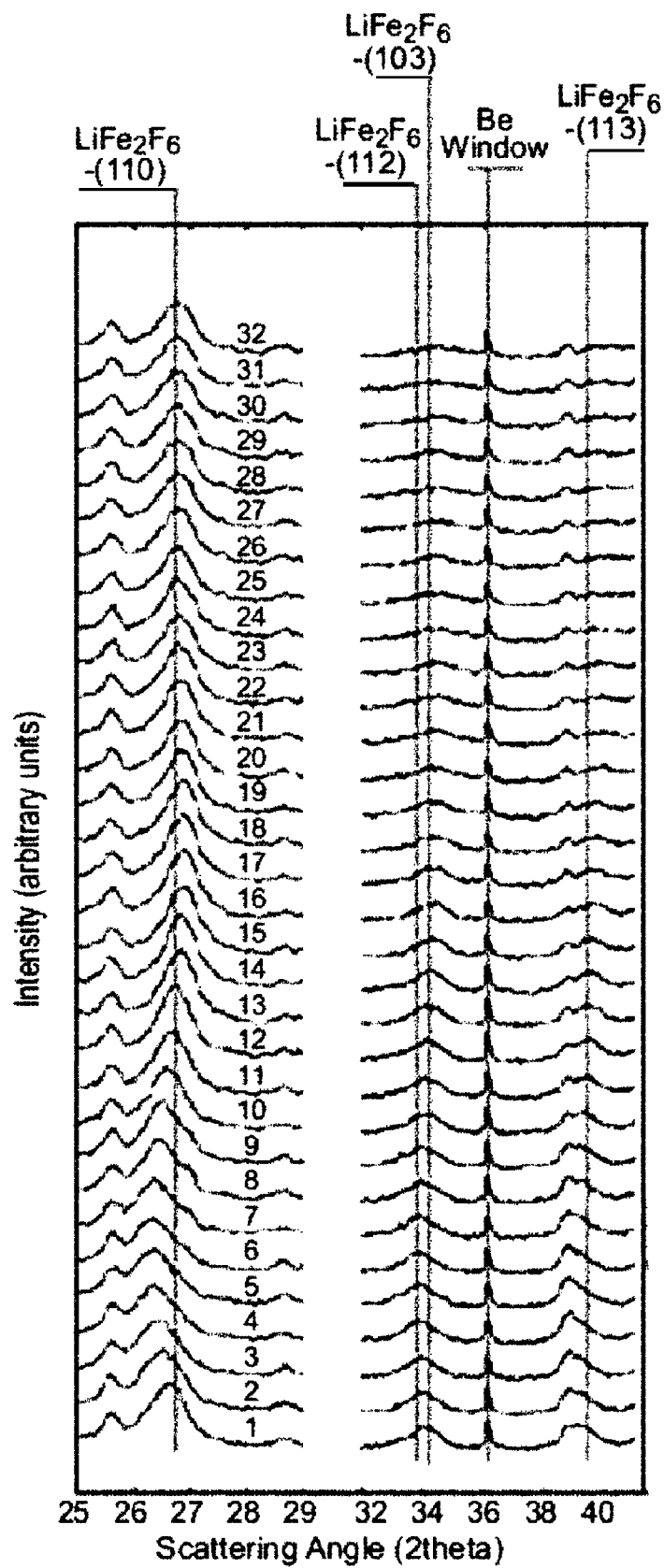

FIGS. 3a and 3b show the results of an in-situ XRD experiment made on a $Li/LiFe_2F_6$ cell during the first discharge-charge cycle. FIG. 3b shows two portions of the x-ray scans collected during the discharge-charge cycle illustrated in FIG. 3a. The scan numbers are indicated in both FIGS. 3a and 3b. During the first discharge, in the plateau near 3.0 V, the (110), (112), (103) and (113) Bragg peaks shifted to lower angles. This is consistent with the intercalation of lithium into the tunnels of the structure causing the expansion of the a-axis. Similar lattice expansions have been observed during the intercalation of lithium within other rutile-structure materials such as $Li_xMoO_2$ and $Li_xWO_2$. During the first charge, a plateau around 3.2 V and a sloping potential region above 4.0 V were observed. In the plateau region, the (110), (112), (103) and (113) Bragg peaks shifted back to larger scattering angles, indicating that the lithium de-intercalation is reversible. The shift in the (110) peak is 0.25 degrees which corresponds to an a-axis expansion of about 1.86% during the intercalation of lithium. This expansion is smaller than the about 6.43% found for $\Delta x=1$ in $Li_xMoO_2$. In the region above 4.0V the (110) peak exhibited very little change, while the (103) and (113) peaks became much broader. Although not wishing to be limited by theory, this may be caused by the extraction of Li atoms from the metal atom chains that could lead to significant c-axis strain leading to broader (hk1) peaks and unbroadened (hk0) peaks.

Figure 4A:
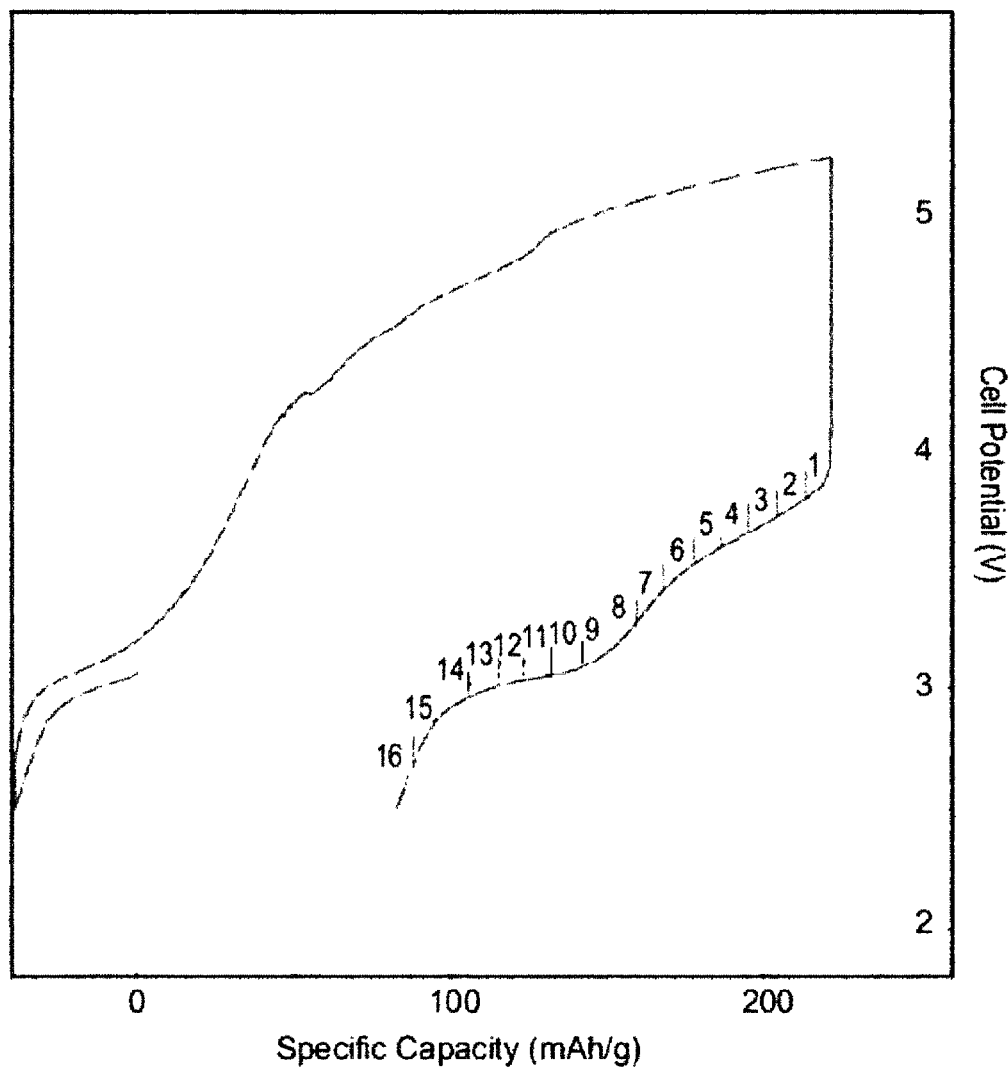
FIGS. 4a and 4b are plots illustrating in-situ x-ray diffraction patterns measured for an example $Li/LiFe_2F_6$ cell during the second discharge of the cell.
Figure 4B:
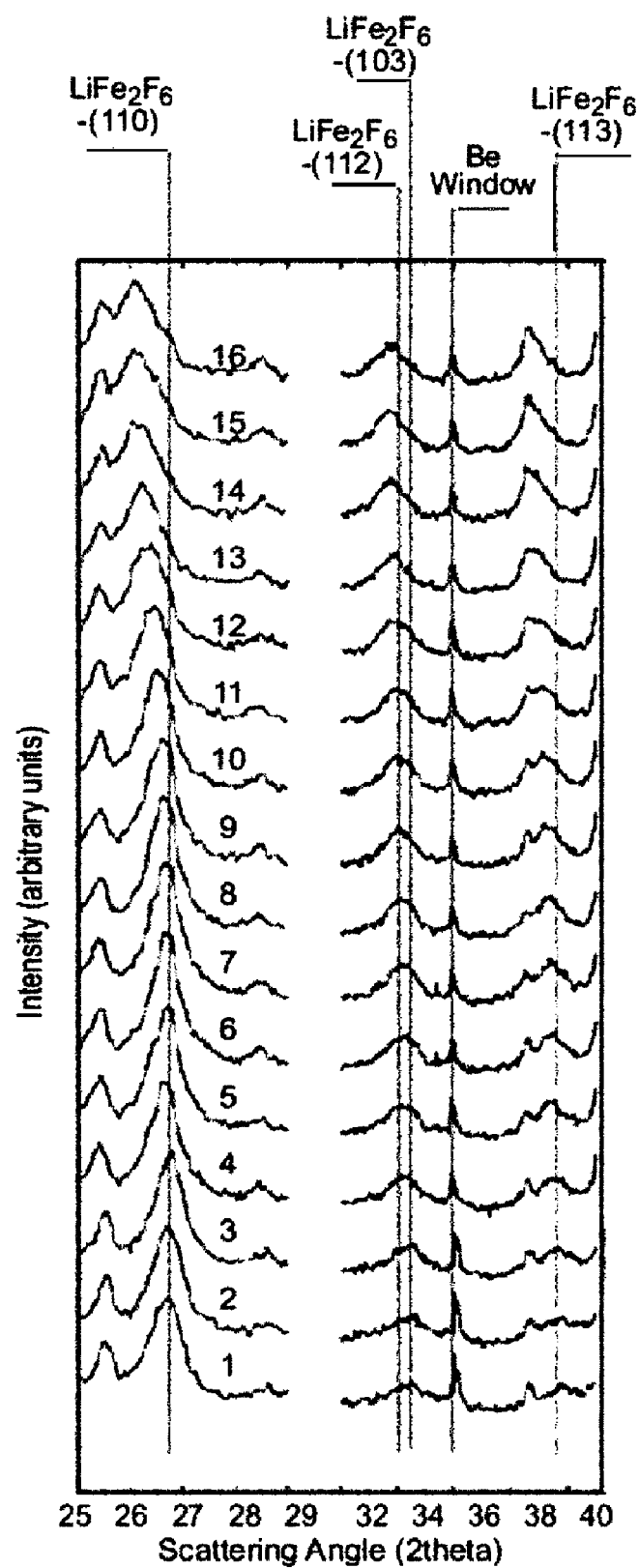

FIGS. 4a and 4b show the in-situ XRD results collected during the second discharge of the cell. In a manner similar to that of FIGS. 3a and 3b, FIG. 4b shows two portion of the x-ray scans collected during the second discharge of the cell illustrated in FIG. 4a. The scan numbers are indicated in both FIGS. 4a and 4b. The discharge capacity is much smaller than the capacity of the previous charge to 5.2 V, presumably because part of the first charge capacity corresponded to parasitic side reactions. Nevertheless, the voltage-capacity curve for the second discharge shows a sloping region near 3.6 V and a plateau region near 3.0 V. During the region near 3.6 V (scans 1-8 in FIG. 4) the (110) Bragg peak shows no discernable change, while the (112), (103) and (113) Bragg peaks sharpen to match their original shapes at the beginning of the experiment. Although not wishing to be limited by theory, this may indicate that Li atoms are reinserted into the sites along the metal atom chains from which they were extracted during the first charge above 4.0V. During the plateau region near 3.0 V (scans 10-18 in FIG. 4), all of the (110), (112), (103) and (113) peaks shift to lower angles indicating that Li ions are inserted back into the tunnels of the rutile structure causing a-axis expansion again. The shift in the (110) peak over the entire discharge from 4.5V to 2.0V is 0.29 degrees which corresponds to a total a-axis expansion of about 2.18% during the intercalation of lithium. The changes observed in FIGS. 3 and 4, apart from the parasitic side reactions, were reversible.

Figure 5A:
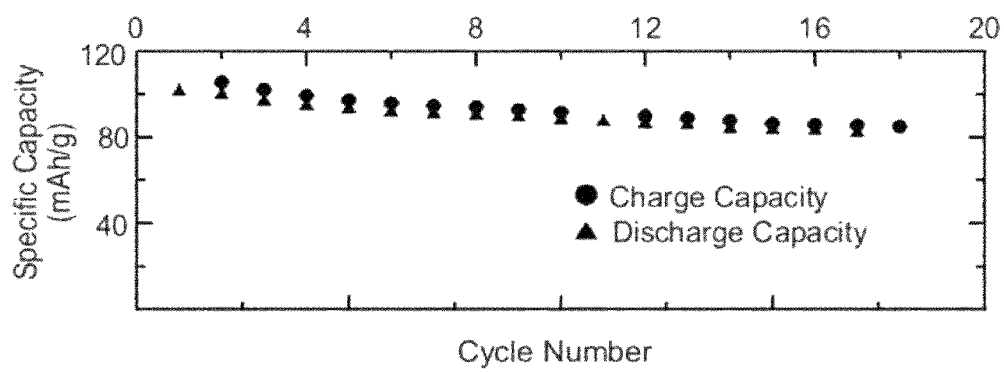
FIGS. 5a-5d are plots illustrating specific capacity versus cycle number and differential capacity versus cell potential measured for an example $Li/LiFe_2F_6$ cell.
Figure 5B:
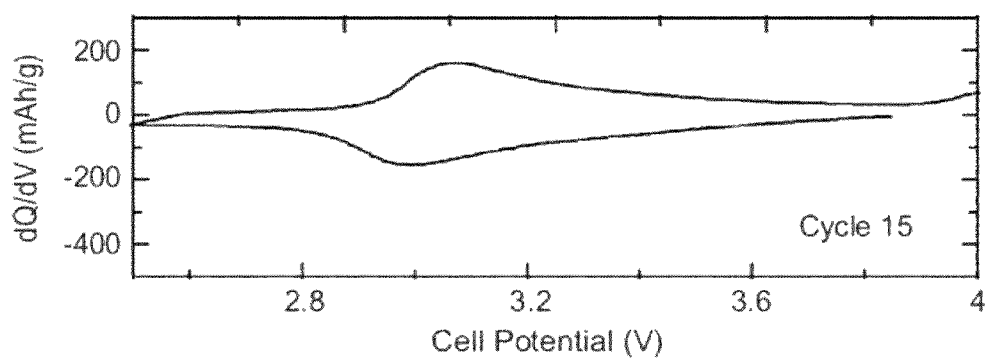
Figure 5C:
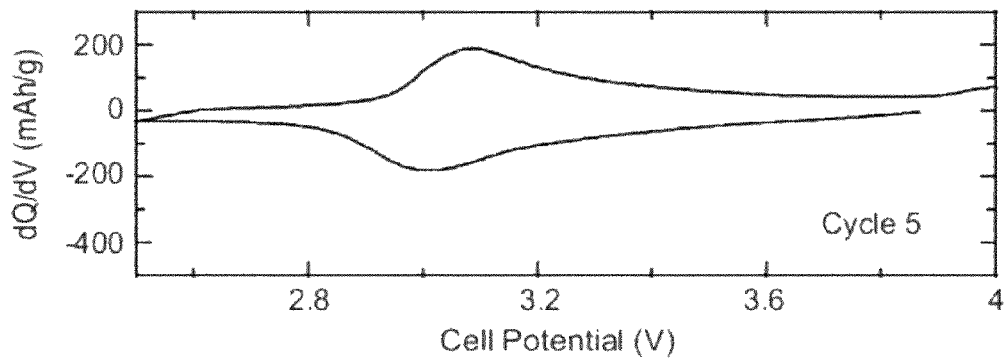
Figure 5D:
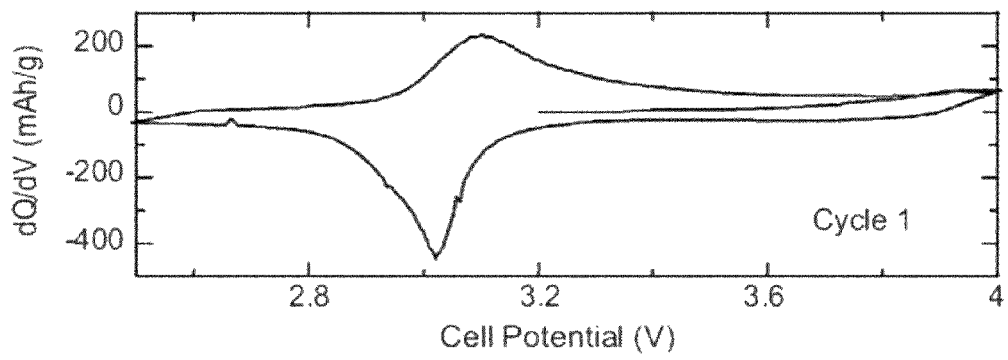

FIG. 5a-d show the discharge-charge cycling results for only the 2.5 to 4.0V region. FIG. 5a shows the discharge-charge specific capacities of a Li/LiFe$_2$F$_6$ cell (the 85 wt. % LiFe$_2$F$_6$-15 wt. % carbon composite was used) as a function of cycle number. The initial discharge capacity is about 102 mAh/g. After cycling for 18 cycles, about 83 mAh/g discharge specific capacity remains. FIGS. 5b-d show the differential capacity versus potential of cycles 15, 5 and 1, respectively, and demonstrate the reversibility and single phase nature of the lithium intercalation in this potential range.

For comparison, LiMgFeF$_6$ (Example 2) was also synthesized by high-energy ball-milling and its electrochemical activity was characterized. Since Mg$^{2+}$ cannot be oxidized to Mg$^{3+}$, it was expected that no lithium could be removed from the metal atom chains. However, since Fe$^{3+}$ can be reduced, there is no electronic reason why Li atoms could not be inserted into the rutile tunnels. Therefore, it was possible that LiMgFeF$_6$ would exhibit discharge capacity.

FIG. 6 shows the XRD pattern collected from LiMgFeF$_6$ prepared by high-energy ball-milling a stoichiometric mixture of LiF, MgF$_2$ and FeF$_3$ for 40 hours, as described above. As was done with LiFe$_2$F$_6$ (Example 1), a Rietveld calculation and refinement of the XRD pattern were carried out with the Rietica software to confirm the structure of the LiMgFeF$_6$ phase formed. The calculated pattern was based on the rutile structure with disordered cations instead of the ordered trirutile structure. Each of the Li, Mg and Fe atoms were occupied the cation position in the rutile structure with ⅓ occupation. The solid line shows the calculated pattern, which agrees well with the experimental XRD pattern. The full width at half maximum of the LiMgFeF$_6$ (110) peak was about 0.62 degrees. Using Scherrer's equation, the grain size of the LiMgFeF$_6$ phase was estimated around 13 nm.

Figure 7:
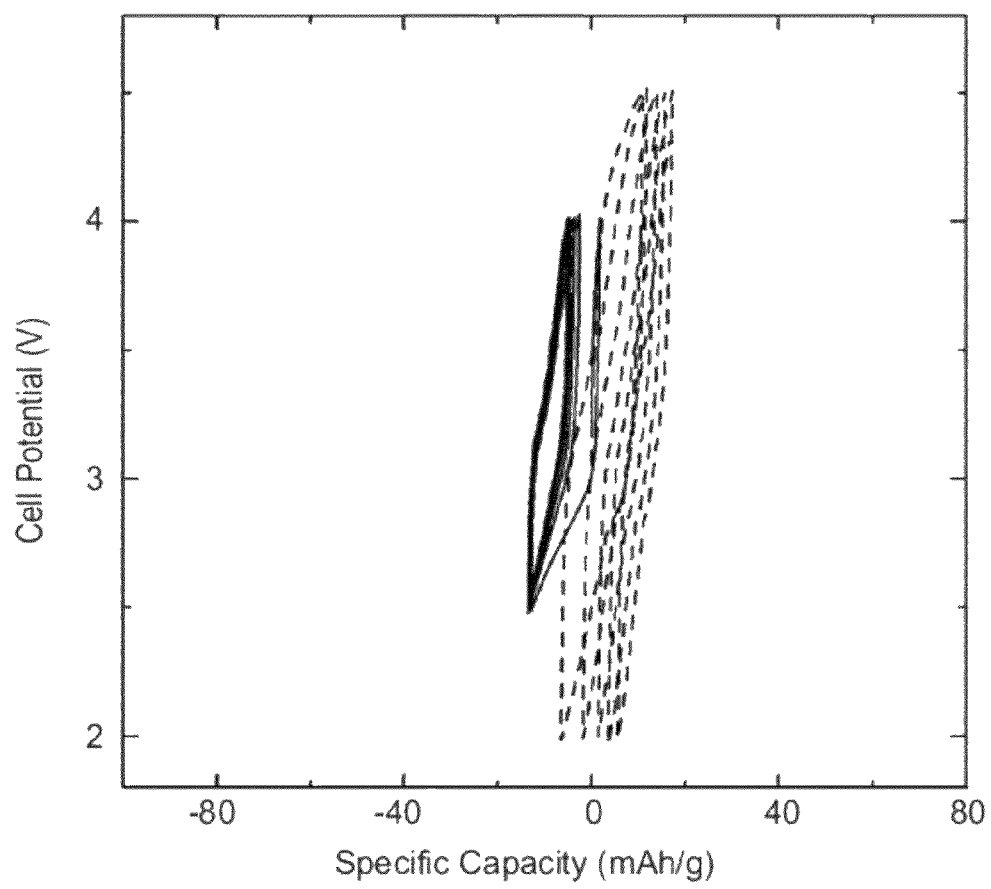
FIG. 7 is a plot illustrating charge/discharge profiles for an example $Li/LiMgFeF_6$ cell.

FIG. 7 shows the potential-capacity curves for Li/LiMgFeF$_6$ cells having positive electrodes of LiMgFeF$_6$ that had been high-energy ball milled with about 15 wt. % super S carbon. This LiMgFeF$_6$/carbon composite active composition was then mixed with about 7 wt. % Super-S carbon and about 7 wt. % PVDF binder during the electrode making procedure. FIG. 7 indicates substantially no electrochemical activity was found showing that lithium cannot be inserted into or removed from this phase.

In summary, "cation disordered" LiFe$_2$F$_6$ and LiMgFeF$_6$ were synthesized by high-energy ball-milling. Electrochemical characterization of the respective examples shows that LiFe$_2$F$_6$ can react with Li reversibly between 2.0 and 4.5V while LiMgFeF$_6$ exhibits little to no reactivity. In-situ XRD was carried out to show that up to about 0.6 mole Li ions can be reversibly intercalated into the tunnels of one mole LiFe$_2$F$_6$ and to propose that at least 0.5 mole Li ions can be extracted from the metal atom chains for one mole LiFe$_2$F$_6$. It is suggested that the amount of Li ions that can be reversibly intercalated and extracted from the LiFe$_2$F$_6$ may be more than observed in the described examples.

Example B

Li$_{1+n}$Fe$_2$F$_{6+n}$ Compositions

Four different sample compositions having the formula Li$_{1+n}$Fe$_2$F$_{6+n}$, with n approximately equal to 0 (Example 3), 0.2 (Example 4), 0.5 (Example 5), and 0.8 (Example 6), were synthesized using a Spex 8000M high-energy ball mill (Spex CertiPrep, Metuchen, N.J.). The respective sample compositions were prepared from stoichiometric mixtures of LiF (Sigma Aldrich, precipitated, 99.995%), FeF$_2$ (Sigma Aldrich, 98%) and FeF$_3$ (Alfa Aesar, anhydrous, 97% min). For example, to prepare Example 4 (the Li$_{1.2}$FeF$_{6.2}$ sample composition), a molar ratio of 1.2:1:1 of LiF, FeF$_2$, and FeF$_3$, respectively, was used.

The milling was performed in hardened steel vials with four approximately 0.5 inch diameter hardened steel balls added. The milling vials were loaded with a total mass of approximately 4 grams of the reactant in an argon-filled glove box. After approximately 40 hours of milling, the steel vials were opened in the glove box and a sample for each of Examples 3-6 was extracted for x-ray diffraction.

Figure 8:
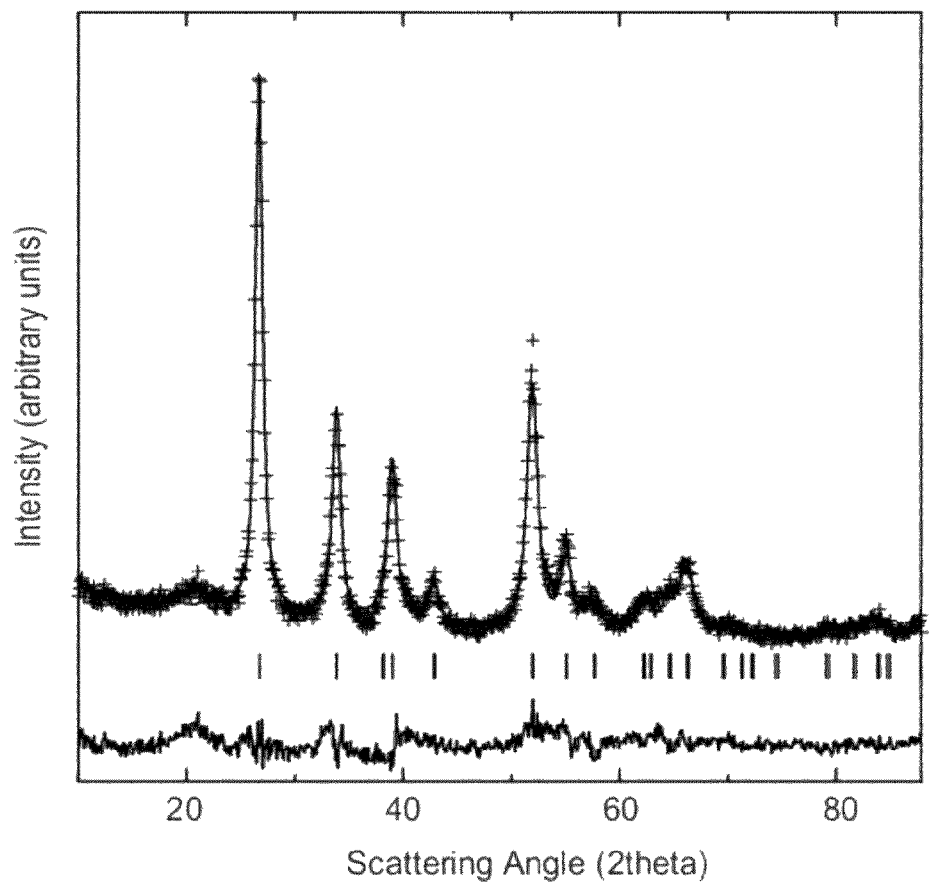
FIG. 8 is a plot illustrating the x-ray diffraction pattern measured for an example $LiFe_2F_6$ composition.
Figure 9:
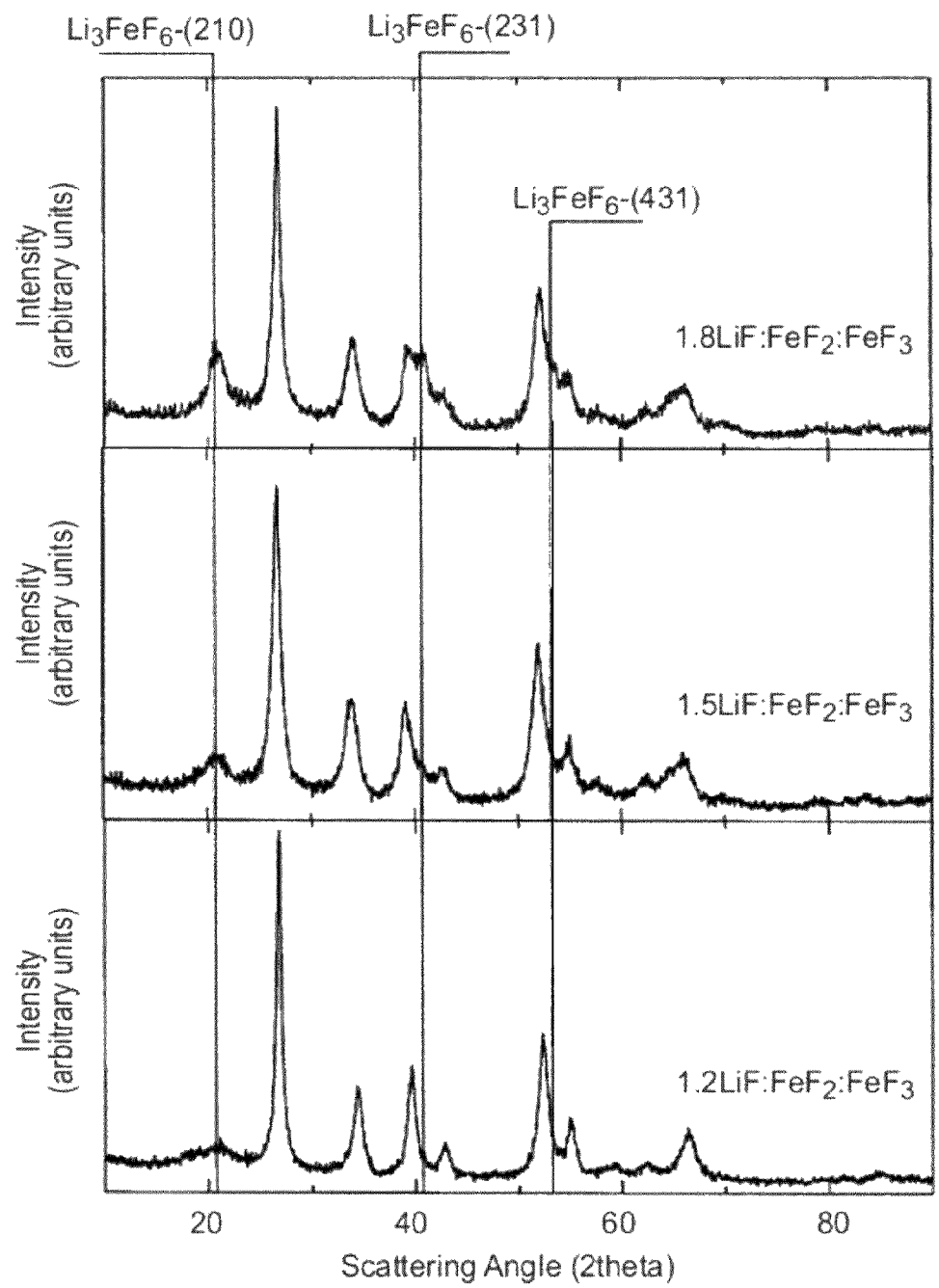
FIG. 9 is a plot illustrating the x-ray diffraction patterns measured for three different example $Li_{1+n}Fe_2F_{6+n}$ compositions.

FIG. 8 is a plot illustrating the x-ray diffraction pattern and Rietveld profile refinement determined for Example 3. As shown in FIG. 9, the x-ray diffraction pattern of Example 3 shows that the sample composition was predominately a single phase material of the disordered trirutile structure. In such a disordered structure, the Li and Fe atoms are randomly located along the metal atom chains. The lattice constants for Example 3 were determined to be as follows: "a" approximately equal to 4.714 Å and "c" approximately equal to 3.197 Å.

FIG. 9 is a plot illustrating the x-ray diffraction pattern measured for Examples 4, 5, and 6. As shown in FIG. 9, the x-ray diffraction pattern of each of Examples 4-6 show that the respective sample compositions included a mixture of LiFe$_2$F$_6$ and Li$_3$FeF$_6$ phases.

Using the sample compositions, example electrodes were formed from the composition of each of Examples 3-6, i.e., example electrodes were formed using the composition of Example 3, other example electrodes were formed using the composition of Example 4, and so forth. In order to increase the electrical conductivity of the compositions of Examples 3-6 prior to making the example electrodes, approximately 85 wt. % of the Li$_{1+n}$Fe$_2$F$_{6+n}$ composition was high-energy ball milled for approximately 1 hours with approximately 15 wt. % Super-S carbon black (MMM Carbon, Belgium). The resulting Li$_{1+n}$Fe$_2$F$_{6+n}$/carbon composite active material was mixed with approximately 7 wt. % Super-S carbon black (MMM Carbon, Belgium) and approximately 7 wt. % polyvinylidene diflouride (PVDF) binder dissolved in a N-Methylpyrrolidone (NMP) solvent to produce an electrode slurry. The electrode slurry was then spread onto a thin aluminum foil using a notch-bar spreader with a gap of approximately 0.08 mm. The coated aluminum foil was then dried at approximately 90 degrees Celsius for approximately 12 hours. Disc-shaped cathodes having a diameter of approximately 12 millimeters were obtained from each of the dried electrode compositions using a precision punch.

With each disc-shaped cathode electrode, 2325-size (23 mm diameter and 2.5 mm thickness) coin-type cells were fabricated for electrochemical characterizations and for in-situ experiments. Each coin-type cell included one of the four Li$_{1+n}$Fe$_2$F$_{6+n}$ cathodes generated from the composition of Examples 3-6, as described above, three Celgard 2300 seperators (Celgard, Inc., Charlotte, N.C.), a lithium foil common counter electrode, and a lithium foil reference electrode. The components were assembled into the coin cell hardware in an argon-filled glove box. A 1M LiPF$_6$ in EC:DEC [1.2 v/v] solution was used as the electrolyte in each example coin-type cell.

After the coin-type cells were assembled, the cells was charged and discharged to evaluate and compare the performance of the cells with different sample cathodes. In one test procedure, individual coin-type cells having cathodes corresponding to each of Examples 3-6 were charged and discharged between approximately 2.5 volts and approximately 4.0 volts. In another test procedure, individual coin-type cells having cathodes corresponding to each of Examples 3-6 were charged and discharged between approximately 2.0 volts and approximately 4.5 volts. In each case, the cells were first charged to the high voltage limit in an attempt to extract lithium from the cathode electrode, and then discharged to the low voltage limit. The cells were charged and discharged at a C/12 rate, as calculated using the expected theoretical capacity corresponding to the removal of one lithium atom per formula unit of $Li_{1+n}Fe_2F_{6+n}$.

Figure 10:
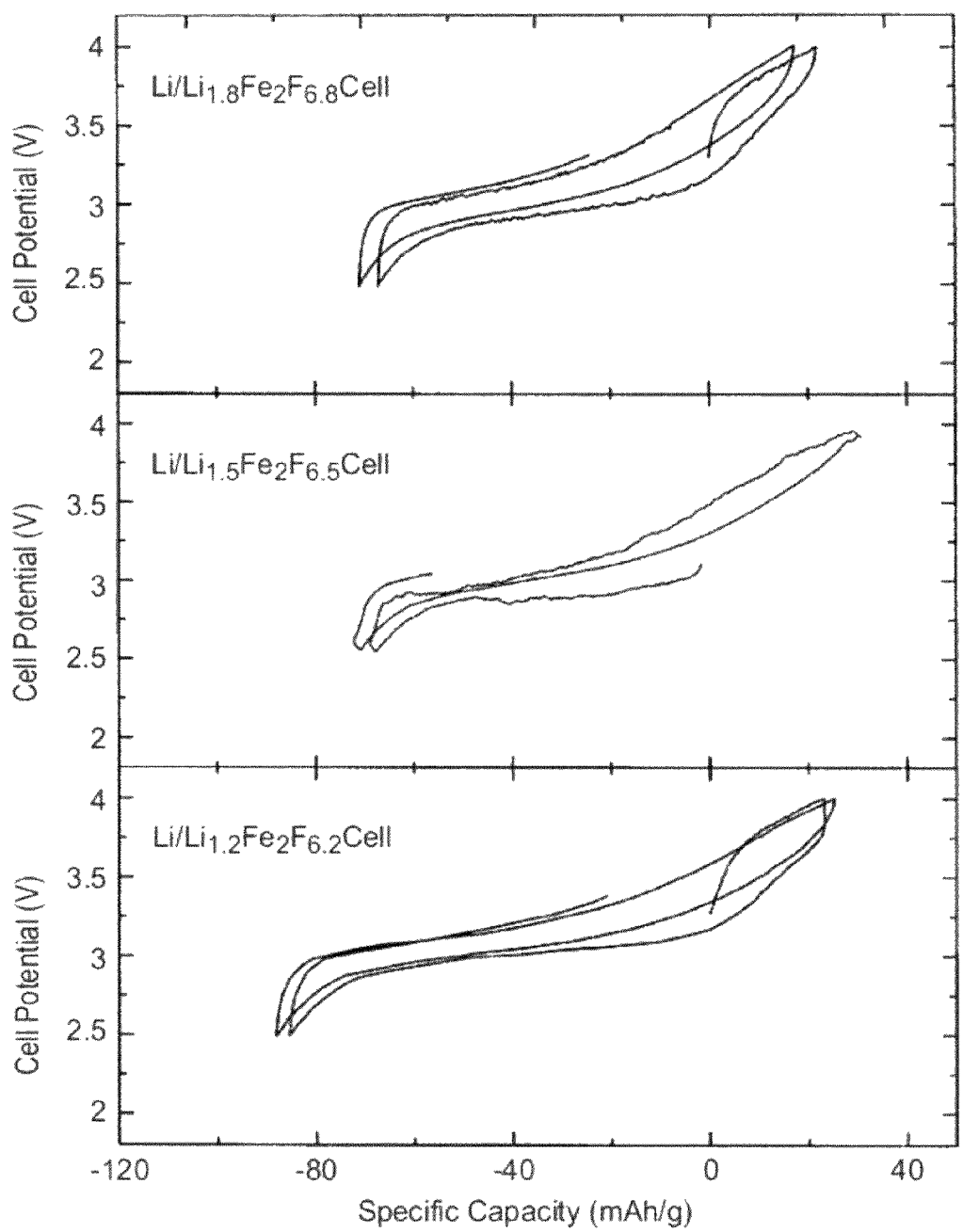
FIG. 10 is a plot illustrating cell potential versus specific capacity measured for three different example $Li/Li_{1+n}Fe_2F_{6+n}$ cells charged and discharged between approximately 4.0 volts and 2.5 volts.

FIG. 10 is a plot illustrating cell potential versus specific capacity measured for three different example $Li/Li_{1+n}Fe_2F_{6+n}$ cells charged and discharged between approximately 4.0 volts and 2.5 volts. In particular, cell potential versus specific capacity was measured for an example $Li/Li_{1.2}Fe_2F_{6.2}$ cell, an example $Li/Li_{1.5}Fe_2F_{6.5}$ cell, and an example $Li/Li_{1.8}Fe_2F_{6.8}$ cell, all of which were fabricated as described above. As shown in FIG. 10, the largest specific capacity of the three example cells was measured for the $Li/Li_{1.2}Fe_2F_{6.2}$ cell at approximately 109 mAh/g.

Figure 11:
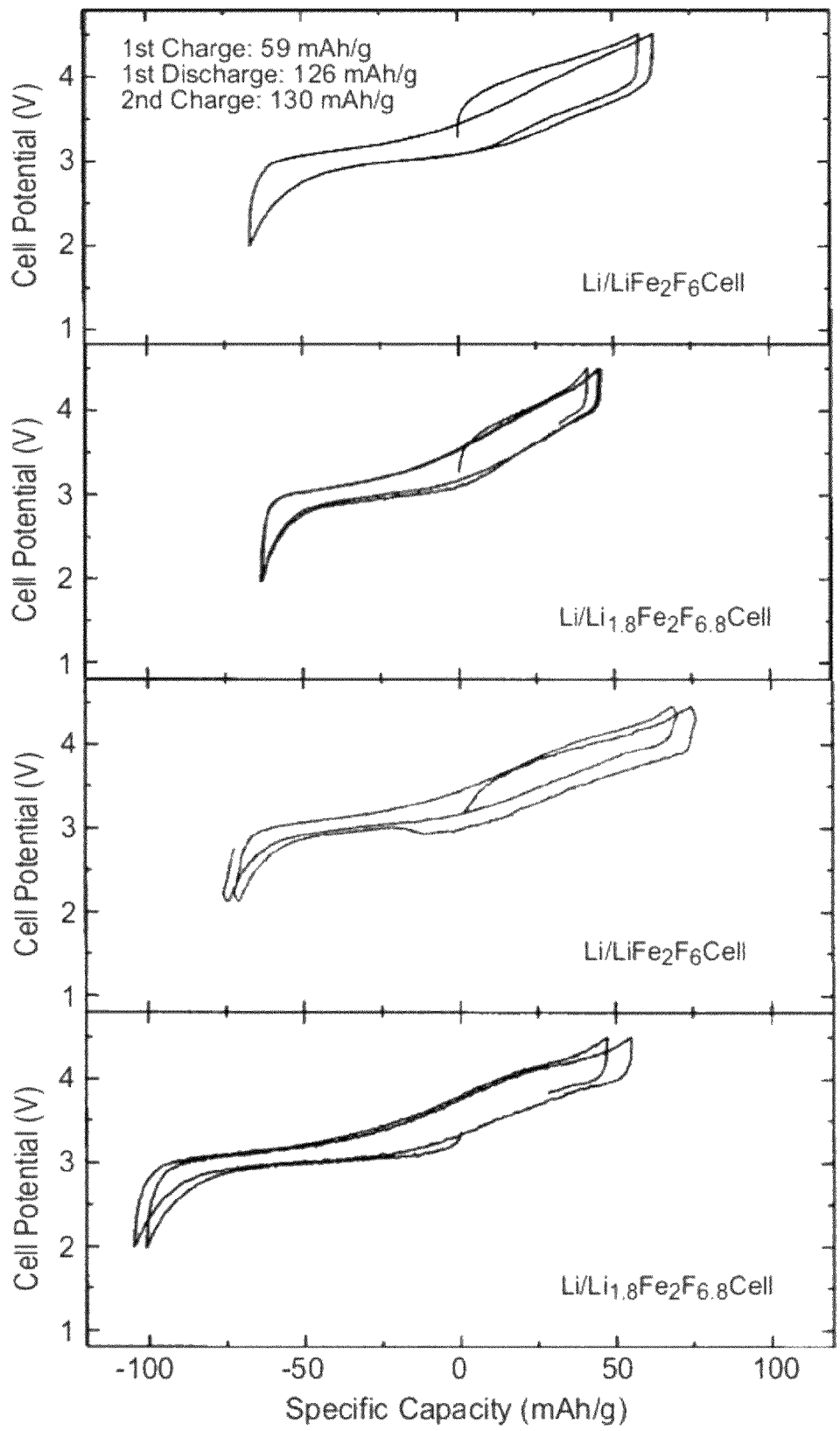
FIG. 11 is a plot illustrating cell potential versus specific capacity measured for four different example $Li/Li_{1+n}Fe_2F_{6+n}$ cells charged and discharged between approximately 4.5 volts and 2.5 volts.

FIG. 11 is a plot illustrating cell potential versus specific capacity measured for four different example $Li/Li_{1+n}Fe_2F_{6+n}$ cells charged and discharged between approximately 4.0 volts and 2.5 volts. In particular, cell potential versus specific capacity was measured for an example $Li/LiFe_2F_6$ cell, an example $Li/Li_{1.2}Fe_2F_{6.2}$ cell, an example $Li/Li_{1.5}Fe_2F_{6.5}$ cell, and an example $Li/Li_{1.8}Fe_2F_{6.8}$ cell, all of which were fabricated as described above. As shown in FIG. 11, the largest specific capacity of the four example cells was measured for the $Li/Li_{1.2}Fe_2F_{6.2}$ cell at approximately 160 mAh/g.

Figure 12:
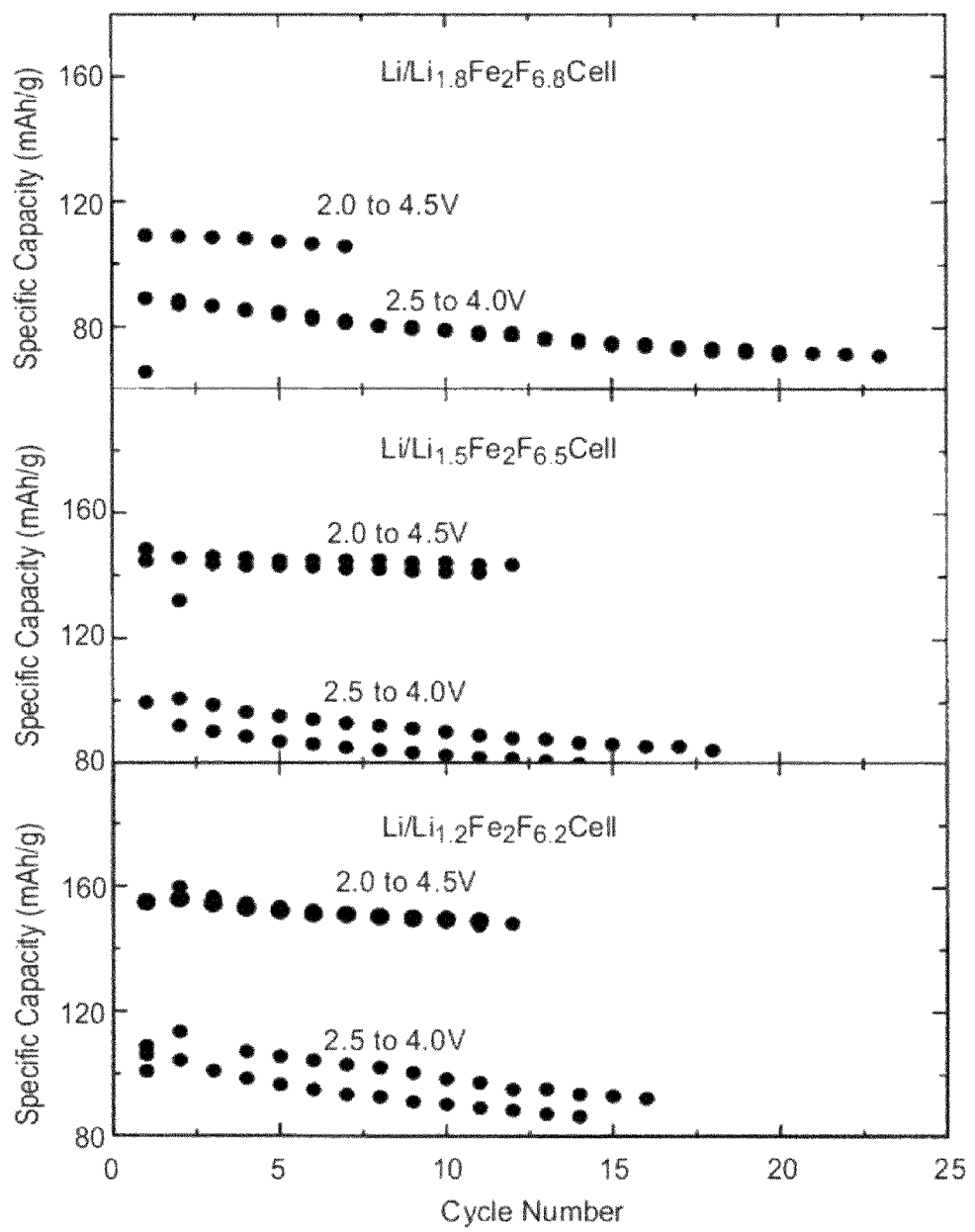
FIG. 12 is a plot illustrating specific capacity versus cycle number measured for different example $Li/Li_{1+n}Fe_2F_{6+n}$ cells.

FIG. 12 is a plot illustrating specific capacity versus cycle number measured for different example $Li/Li_{1+n}Fe_2F_{6+n}$ cells. In particular, example $Li/Li_{1.2}Fe_2F_{6.2}$ cells, example $Li/Li_{1.5}Fe_2F_{6.5}$ cells, and example $Li/Li_{1.8}Fe_2F_{6.8}$ cells, all of which were fabricated as described above, where charged and discharged according to the upper and lower potential limits indicated in FIG. 12 (either approximately 2.0 volts to approximately 4.5 volts or approximately 2.5 volts to approximately 4.0 volts). The specific capacity of each example cell was determined for each cycle. As shown, stable charge/discharge cycling with a specific capacity of approximately 160 mAh/g was observed for the example $Li/Li_{1.2}Fe_2F_{6.2}$ cell cycled from approximately 2.0 volts to approximately 4.5 volts.

Various embodiments of the invention have been described. The implementations described above and other implementations are within the scope of the following claims. All references cited within this disclosure are herein incorporated by reference in their entirety.

The invention claimed is:

1. An electrochemical cell comprising an electrode, the electrode comprising a composition comprising the elements of Li, Fe, and F, wherein the composition includes a first phase having a disordered trirutile structure.

2. The electrochemical cell of claim 1, wherein the composition has the formula $Li_xFe_yF_z$, wherein x is greater than approximately 0.4 and less than approximately 2.5, and z is greater than approximately 5.5 and less than approximately 6.5, with y equal to approximately 2.

3. The electrochemical cell of claim 2, wherein the ratio of z to y is greater than approximately 3 to 1.

4. The electrochemical cell of claim 2, wherein y equals approximately 2 and z equals approximately 6.

5. The electrochemical cell of claim 4, wherein x is greater than approximately 0.5 and less than approximately 2.0.

6. The electrochemical cell of claim 1, wherein the composition has the formula $Li_{1+n}Fe_2F_{6+n}$, wherein n is greater than 0.

7. The electrochemical cell of claim 6, wherein $0.0 < n \leq$ approximately 0.8.

8. The electrochemical cell of claim 6, wherein n equals approximately 0.2.

9. The electrochemical cell of claim 1, wherein the composition further includes a $Li_3FeF_6$ phase.

10. The electrochemical cell of claim 1, wherein the composition is formed via high energy ball milling of at least the elements of Li, Fe, and F.

11. The electrochemical cell of claim 1, wherein the electrochemical cell exhibits a specific capacity of greater than approximately 100 mAh/g.

12. The electrochemical cell of claim 1, wherein the composition exhibits reversible reactivity with lithium via an intercalation reaction.

13. The electrochemical cell of claim 1, wherein the composition further comprises at least one of Ti, V, Cr, Mn, Co, Ni, or Cu.

14. A battery pack comprising at least one electrochemical cell accordingly to claim 1.

15. An electronic device comprising a battery pack according to claim 14.

16. A method comprising forming a composition comprising the elements of Li, Fe, and F, the composition having a first phase including a disordered trirutile structure.

17. The method of claim 16, wherein the composition has the formula $Li_xFe_yF_z$, wherein x is greater than approximately 0.4 and less than approximately 2.5, and z is greater than approximately 5.5 and less than approximately 6.5, with y equal to approximately 2.

18. The method of claim 16, wherein x equals approximately 1, y equals approximately 2, and z equals approximately 6.

19. The method of claim 16, wherein the composition has excess lithium.

20. The method of claim 16, further comprising forming an electrode of an electrochemical cell, wherein the electrode includes the composition.

21. The method of claim 16, wherein the composition is formed via at least one of high-energy balling milling, mechanical attriting, roller milling or pebble milling.

* * * * *

UNITED STATES PATENT AND TRADEMARK OFFICE
CERTIFICATE OF CORRECTION

| | | |
|---|---|---|
| PATENT NO. | : 8,137,841 B2 | Page 1 of 2 |
| APPLICATION NO. | : 12/550762 | |
| DATED | : March 20, 2012 | |
| INVENTOR(S) | : Jeffrey Raymond Dahn | |

It is certified that error appears in the above-identified patent and that said Letters Patent is hereby corrected as shown below:

Title Page 2, Column 1,
Line 1, Other Publications, delete ""Cornbinatorially" and insert --"Combinatorially-- therefor.

Title Page 2, Column 2,
Line 3, Other Publications, delete "1218," and insert --A1218,-- therefor.

Title Page 2, Column 2,
Line 6, Other Publications, delete "A1878A1885," and insert --A1878-A1885,-- therefor.

Title Page 2, Column 2,
Line 18, Other Publications, delete "$Fe_22F_{6+n}$" and insert --$Fe_2F_{6+n}$-- therefor.

Title Page 2, Column 2,
Line 18, delete "Materialsfor" and insert --Materials for-- therefor.

Column 3,
Line 4, delete "$Fe^3F_6$" and insert --$Fe^{3+}F_6$-- therefor.

Column 3,
Line 48, delete "$0 \leq b \leq 0.5$." and insert --$0<b<0.5$.-- therefor.

Column 7,
Line 33, delete "butylrolactone," and insert --butyrolactone,-- therefor.

Column 10,
Line 16, delete "$Li_iFe_2F_6$" and insert --$Li_{1-x}Fe_2F_6$-- therefor.

Column 11,
Line 4, delete "FIG." and insert --FIGS.-- therefor.

Signed and Sealed this
Tenth Day of July, 2012

David J. Kappos
*Director of the United States Patent and Trademark Office*

CERTIFICATE OF CORRECTION (continued)
U.S. Pat. No. 8,137,841 B2

Column 11,
Line 61, delete "$Li_{i+n}Fe_2F_{6+n}$" and insert --$Li_{1+n}Fe_2F_{6+n}$-- therefor.

Column 12,
Line 42, delete "diflouride" and insert --difluoride-- therefor.

Column 12,
Lines 56-57, delete "seperators" and insert --separators-- therefor.

Column 13,
Line 17, delete "$Li/Li_{12}Fe_2F_{6.2}$" and insert --$Li/Li_{1.2}Fe_2F_{6.2}$-- therefor.

Column 13,
Line 17 delete "$Li/Li_{15}Fe_2F_{6.5}$" and insert --$Li/Li_{1.5}Fe_2F_{6.5}$-- therefor.